(12) United States Patent
Miller et al.

(10) Patent No.: US 10,073,546 B2
(45) Date of Patent: Sep. 11, 2018

(54) TRACK PAD WITH INTERIOR BEZEL

(71) Applicant: Honda Motor Co., Ltd., Tokyo (JP)

(72) Inventors: Ross C. Miller, Hilliard, OH (US); Cody D. Grebe, Marysville, OH (US); Churu Yun, Seattle, WA (US)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 14/983,669

(22) Filed: Dec. 30, 2015

(65) Prior Publication Data

US 2016/0188064 A1 Jun. 30, 2016

Related U.S. Application Data

(60) Provisional application No. 62/098,613, filed on Dec. 31, 2014.

(51) Int. Cl.
*G06F 3/041* (2006.01)
*G06F 3/0354* (2013.01)

(52) U.S. Cl.
CPC .......... *G06F 3/03547* (2013.01); *G06F 3/041* (2013.01); *G06F 2203/04803* (2013.01); *G06F 2203/04809* (2013.01)

(58) Field of Classification Search
None
See application file for complete search history.

(56) References Cited

U.S. PATENT DOCUMENTS

| | | | |
|---|---|---|---|
| 5,757,268 A | 5/1998 | Toffolo et al. | |
| 6,232,957 B1 | 5/2001 | Hinckley | |
| 7,088,343 B2 | 8/2006 | Smith et al. | |
| 7,126,581 B2 | 10/2006 | Burk et al. | |
| 8,078,359 B2 | 12/2011 | Small et al. | |
| 8,115,749 B1 | 2/2012 | Simpson | |
| 8,188,969 B2 | 5/2012 | Morin et al. | |
| 8,406,961 B2 | 3/2013 | Pathak et al. | |
| 8,451,219 B2 | 5/2013 | Morin et al. | |
| 8,606,519 B2 | 12/2013 | Waeller | |
| 8,711,115 B2 | 4/2014 | Ozawa et al. | |
| 8,860,676 B2 | 10/2014 | Higashi et al. | |
| 8,892,299 B2 | 11/2014 | Small et al. | |
| 8,907,778 B2 | 12/2014 | Waeller et al. | |
| 2002/0060668 A1 | 5/2002 | McDermid | |
| 2003/0043123 A1* | 3/2003 | Hinckley | G06F 3/021 345/173 |
| 2004/0239622 A1* | 12/2004 | Proctor | G06F 3/03547 345/156 |
| 2007/0057922 A1* | 3/2007 | Schultz | G06F 3/03547 345/173 |
| 2007/0185631 A1 | 8/2007 | Yeh et al. | |

(Continued)

FOREIGN PATENT DOCUMENTS

| | | |
|---|---|---|
| GB | 2446468 | 8/2008 |
| JP | 2013105425 | 5/2013 |
| JP | 5617783 | 11/2014 |

*Primary Examiner* — Stephen T Reed

(74) *Attorney, Agent, or Firm* — Rankin, Hill & Clark LLP

(57) ABSTRACT

A two-zone track pad and a system including a two-zone track pad and corresponding display are disclosed herein. An example two-zone track pad for controlling a two-zone display includes a first track pad section, a second track pad section, and a bezel disposed between the first track pad section and the second track pad section.

13 Claims, 6 Drawing Sheets

(56) References Cited

U.S. PATENT DOCUMENTS

| | | | |
|---|---|---|---|
| 2008/0012831 A1* | 1/2008 | Bauman | G06F 1/1616 |
| | | | 345/173 |
| 2008/0258995 A1 | 10/2008 | Vissenberg et al. | |
| 2010/0188343 A1 | 7/2010 | Bach | |
| 2011/0043468 A1 | 2/2011 | Lathrop et al. | |
| 2011/0169750 A1 | 7/2011 | Pivonka et al. | |
| 2012/0007823 A1* | 1/2012 | Ozawa | G06F 3/0236 |
| | | | 345/173 |
| 2012/0139858 A1 | 6/2012 | Simpson | |
| 2013/0113726 A1 | 5/2013 | Tovar et al. | |
| 2013/0140965 A1* | 6/2013 | Franklin | G06F 1/1626 |
| | | | 312/223.1 |
| 2014/0049476 A1* | 2/2014 | Bragin | G06F 1/169 |
| | | | 345/173 |
| 2014/0062872 A1 | 3/2014 | Tanaka | |
| 2015/0022475 A1* | 1/2015 | Watanabe | G06F 3/041 |
| | | | 345/173 |

\* cited by examiner

US 10,073,546 B2

TRACK PAD WITH INTERIOR BEZEL

RELATED APPLICATION

This application claims priority to U.S. Provisional Application No. 62/098,613, filed on Dec. 31, 2014, the entire contents of which are incorporated by reference herein.

BACKGROUND

The subject matter disclosed herein relates to a multiple zone track pad with a divider such as a bezel separating the zones.

SUMMARY

In one aspect, a two-zone track pad for controlling a two-zone display includes a first track pad section, a second track pad section, and a bezel disposed between the first track pad section and the second track pad section.

In another aspect, a system includes a two-zone track pad including a first track pad section, a second track pad section, and a bezel disposed between the first track pad section and the second track pad section. The system also includes a two-zone display including a first display section and a second display section, where the first track pad section controls operations on the first display section and the second track pad section controls operations on the second display section.

In still another aspect, a two-zone track pad for controlling a two-zone display includes a first track pad section configured to control operations on a first display section of a two-zone display, a second track pad section configured to control operations on a second display section of the two-zone display, the first track pad section larger than the second track pad section, and a bezel disposed between the first track pad section and the second track pad section.

BRIEF DESCRIPTION OF THE DRAWINGS

Aspects and advantages of examples disclosed herein are disclosed in the following detailed description, wherein similar structures have similar reference numerals.

DETAILED DESCRIPTION

Exemplary apparatus and a system incorporating a two-zone track pad with an interior bezel separating the zones are disclosed herein. An exemplary apparatus includes two differently-sized track pad sections that map to, i.e., functionally align with, differently-sized sections of a visual display, such as may be found in the navigation system or infotainment controls of a vehicle.

The interior bezel physically separates the two track pad sections and provides a tactile frame of reference to assist the user in locating the adjacent edges and corners of the track pad sections. This tactile frame of reference can be achieved by making the bezel feel texturally different than the track pad sections and/or by orienting it differently than those sections. For example, the bezel may be elevated as compared to the track pad sections, or it may form a transition zone between track pad sections that are disposed at different elevations from one another.

Additionally or alternatively, the track pad sections themselves may include tactilely distinguishable edges, e.g., having raised lips, in order to assist the user in quickly and easily locating the boundaries of the sections. In addition to helping provide a clear distinction and mapping to the display, these features may provide more locations where the user can find button locations simply by feel and without looking.

Additionally or alternatively, the track pad sections may include surfaces having different textures in order to assist the user in quickly and easily identifying which track pad section is being touched, without looking at the track pad. For example, the surface of a first track pad section may feel smooth and the surface of a second track pad section may include bumps, etching, and/or any other surface texture that allows the track pad sections to be identified by feel. Furthermore, both the surface of a first track pad section and the second track pad section may include textures, wherein each texture is different and distinguishable by feel.

Figure 1:
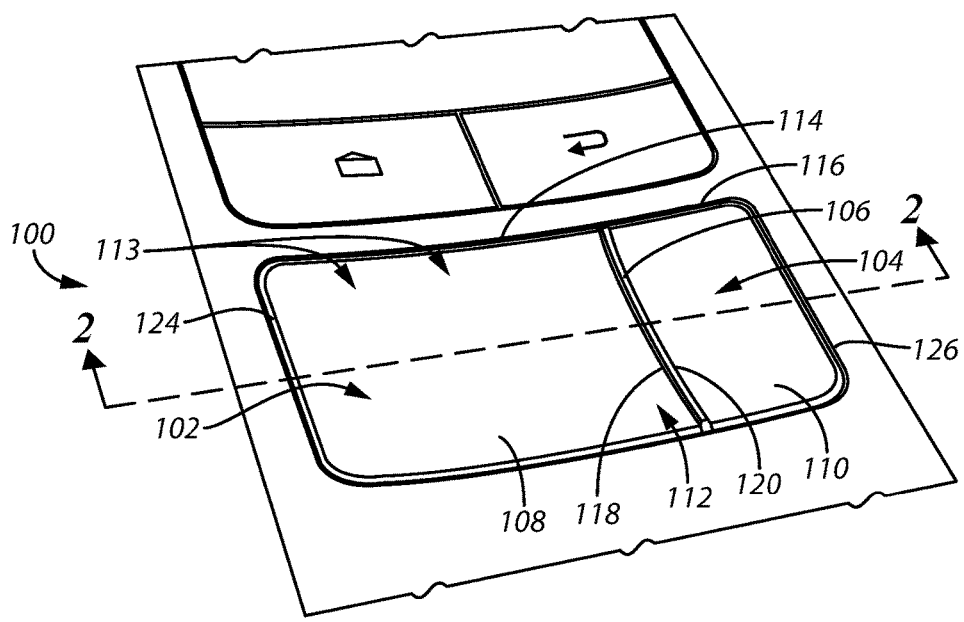
FIG. 1 is perspective view of an exemplary two-zone track pad disclosed herein including a first, larger track pad section and a second, smaller track pad section with a bezel disposed between the first and second track pad sections.
Figure 11:
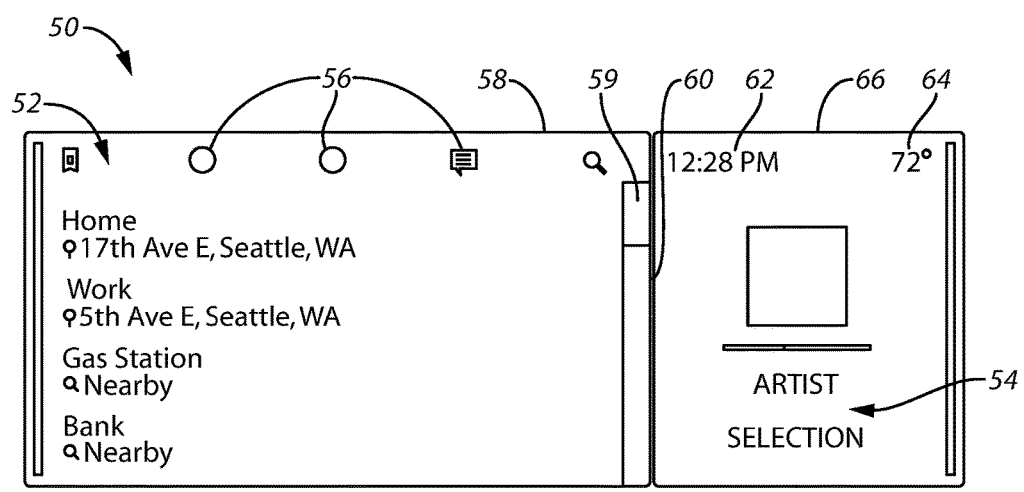
FIG. 11 is a front view of an exemplary display area configured to operatively interface with the two-zone track pad disclosed herein.

FIG. 1 is a view of an exemplary two-zone track pad 100 disclosed herein for interfacing with and controlling selections on a display screen 50, such as shown in FIG. 11, that similarly may be divided into two separate zones. As used herein, the modifiers "track" and "touch" are used interchangeably, e.g., a "track pad" alternatively is considered a "touch pad."

In the illustrated embodiment, the track pad 100 includes a first track pad section 102 and a second track pad section 104 separated by a bezel 106. The first and second track pad sections 102, 104 are disposed alongside one another, with the first track pad section 102 disposed to the left of the second track pad section 104 when the track pad is installed in its ultimate location which may be, e.g., the center console of a vehicle. As referred to herein, a bezel is a raised, depressed, or flush portion surrounding or adjacent to at least a portion of a track pad and/or separating a first track pad section from a second track pad section. The bezel may be a touch sensitive surface or a neutral, inert surface such as a plastic, wood, or metal framing surface.

As seen in FIG. 1, the two track pad sections may be sized differently, with the first track pad section 102 sized substantially larger than the second track pad section 104. For example, the first track pad section 102 may be between about two times and about four times larger than the second track pad section 104 and, as seen in the exemplary embodiment of FIG. 1, about three times larger. The two track pad sections may have substantially the same height, i.e., the dimension in the direction parallel to the bezel 106. Thus, size differences between the two sections are accomplished by varying the widths of those sections in this embodiment.

Each track pad section 102, 104 includes a touch sensitive or other manually actuatable surface 108, 110, respectively. For example, each track pad section 102, 104 may include, or be coupled to, capacitive touch sensors. Additionally, one or both of the track pad sections 102, 104 also may be a mechanical, depressible switch 112. In this manner, the user may navigate a corresponding display screen using one or both of the track pad sections until a desired option is reached. The user then may depress the switch 112 in order to select that option. In one aspect, the first and second track pad sections 102, 104 are mounted independently of one another so that only the track pad section that is depressed moves. Alternatively, the first and second track pad sections 102, 104 are mounted to a common guide portion, such that both sections move even if only one is depressed.

The selectable area of each track pad section may be found in the interior of the section in order to correspond to a similarly located option on the display screen. Additionally or alternatively, the display screen may include one or more icons 56 that correspond to buttons 113 on the track pad sections. In one example, the buttons 113 are areas of specific selectivity on the track pad sections 102, 104 and are disposed along an edge 114, 116, respectively, of those sections. The edges 114, 116 may be top edges of the track pad sections 102, 104 as shown in FIG. 1, although the buttons may be disposed along other edges of the sections or along multiple edges of the sections.

In the first embodiment, the bezel 106 is raised or extends upward as compared to the edges of the first and second track pad sections 102, 104 adjacent to the bezel 106, i.e., the rightmost edge 118 of the first section 102 and the leftmost edge 120 of the second section 104. Additionally, the bezel 106 may be significantly narrower than both the first track pad section 102 and the second track pad section 104. For example, the bezel 106 may be less than about 10% of a width of the total track pad 100. As such, the user may be able to perceive purely from touch that the bezel 106 provides a physical barrier between the track pad sections while, at the same time, perceiving that both track pad sections 102, 104 are part of a single unit.

Track pad 100 may include, or be coupled to, a controller configured to receive signals from track pad 100 and transmit signals to the display screen 50. It is contemplated that in some embodiments the controller is a stand-alone unit that is in signal communication with the track pad 100 and the display screen 50. In some embodiments, the controller is included within, or coupled to, a controller area network (CAN) bus included within the vehicle. Alternatively, the controller may be included in the display screen 50.

It is contemplated that first track pad section 102 and/or second track pad section 104 can support different gestures by one or more fingers that send specific signals for interfacing with and controlling selections on display screen 50. For example, two fingertips moving relative to each other can provide a specific signal to the display screen 50, potentially via the controller, for specific systems. In certain embodiments, two fingers sliding in contact with first track pad section 102 transversely can transition the information presented on the display screen 50 between systems or pages of selectable information. In certain embodiments, two fingers sliding in contact with first track pad section 102 parallel to bezel 106 can scroll the selectable information vertically on the display screen 50. Further, in certain embodiments, two fingers sliding in contact with first track pad section 102 in a circular or rotational pattern can rotate an image presented on the display screen 50. Moreover, a two finger touch, followed by one finger moving further from the other finger can cause an increased zoom/magnification of information presented on display screen 50. Conversely, a two finger touch, followed by one finger moving closer to the other finger can cause a decreased zoom/magnification of information presented on display screen 50. Moreover, three finger touches on first track pad section 102 may trigger predefined functions. Gestures received on second track pad section 104 may cause the same response on the display screen 50 as if the gesture was received on first track pad section 102. In alternative embodiments, not all gestures available on first track pad section 102 are available on second track pad section 104.

Figure 2:
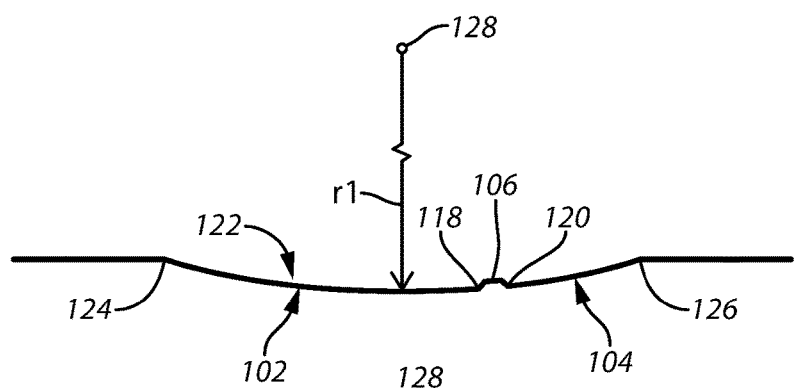
FIG. 2 is a cross-section view through the plane 2-2 in FIG. 1.

Turning to FIG. 2, a cross-sectional view of the first track pad embodiment 100 is provided. As seen in this image, the first and second track pad sections 102, 104 follow a generally continuous curvilinear path 122, where the track pad sections form parts of a convex surface with a radius of curvature centered over the first track pad section 102. More specifically, the center of the radius of curvature may be located halfway between the leftmost edge 124 of the first track pad section 102 and the rightmost edge 126 of the second track pad section 104.

In one aspect, the radius of curvature r1 is centered at a point 128, so that the first and second track pad sections 102, 104 curve about a first line parallel to the bezel 106 and a second line perpendicular to the bezel, i.e., at least one of the sections is bowl-shaped with a singular depression point. In another aspect, the radius of curvature is centered about a line running parallel to the bezel 106, with at least a portion of the first and second track pad sections 102, 104 formed by sweeping the radius of curvature about that line. In other words, instead of a singular depression point, at least one of the first and second track pad sections 102, 104 has a line of lowermost depression running parallel to the bezel 106.

Figure 3:
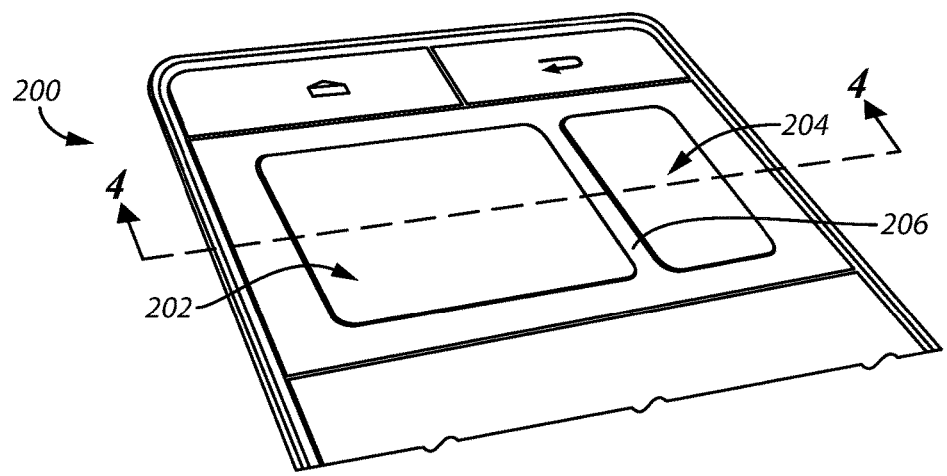
FIG. 3 is a perspective view of a second exemplary two-zone track pad disclosed herein.
Figure 4:
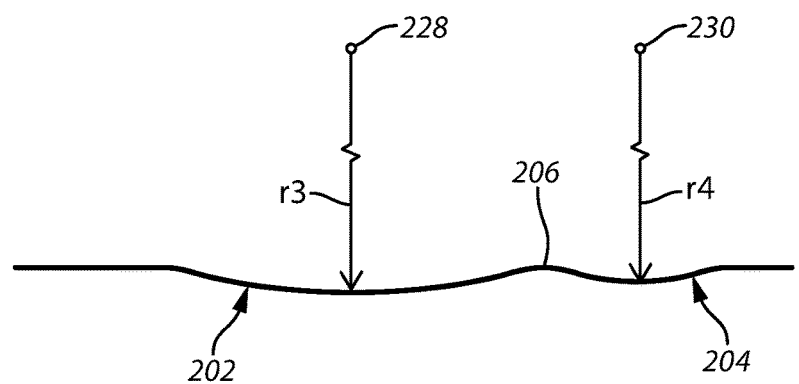
FIG. 4 is a cross-section view through the plane 4-4 in FIG. 3.

Turning now to FIGS. 3-4, a second track pad embodiment 200 is shown. This embodiment 200 is similar to the first track pad embodiment 100 in that it includes a first track pad section 202, a second track pad section 204, and a bezel 206 separating the two track pad sections. The differences between the first and second track pad embodiments are apparent when the profile view of FIG. 4 is viewed. As seen there, the second track pad embodiment 200 has a first radius of curvature r2 for the first track pad section 202 centered over the first track pad section 202 and a separate, second radius of curvature r3 for the second track pad section 204 centered over the second track pad section 204. As with the first track pad embodiment 100, one or both of the radii of curvature in the second track pad embodiment may sweep either about a point 228, 230 centered over their respective track pad sections or about a line bisecting each respective track pad section and running parallel to the bezel 206.

In either case, each track pad section 202, 204 may have its own depression centered on the section, providing the user with a tactile method of locating each track pad section 202, 204. Additionally, the point or line of depression may provide the user with a tactile frame of reference for locating a lateral center of each track pad section 202, 204, assisting the user in navigating to different portions of each track pad section 202, 204, relative to that reference point or line.

In a variation of the second track pad embodiment 200, instead of both track pad sections 202, 204 having curvilinear surfaces, only the first surface 202 is curved, while the second surface 204 either remains substantially planar or otherwise has a larger radius of curvature that conveys to the user that that track pad section feels substantially planar. The second surface 204 may have a width corresponding generally to a finger's width, minimizing a need for the tactile frame of reference that a curvilinear surface provides.

Figure 5:
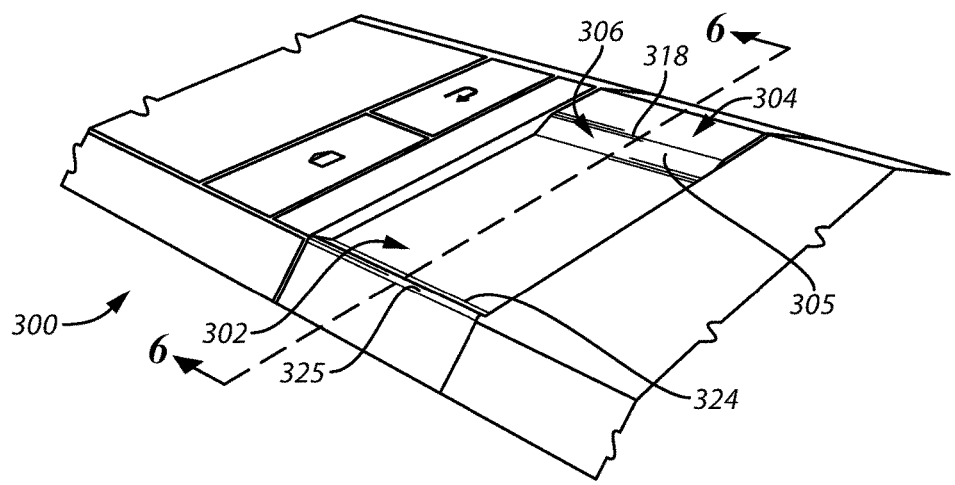
FIG. 5 is a perspective view of a third exemplary two-zone track pad disclosed herein.
Figure 6:
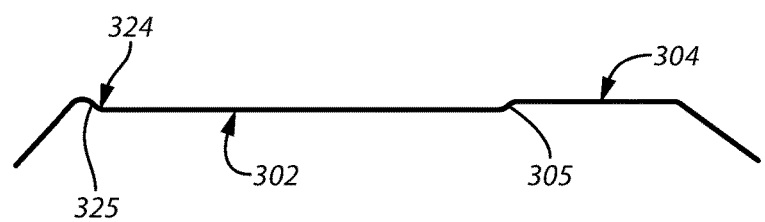
FIG. 6 is a cross-section view through the plane 6-6 in FIG. 5.

Turning now to FIGS. 5-6, a third track pad embodiment 300 is shown. In this embodiment, the first track pad section 302 is adjacent to the second track pad section 304. Each track pad section 302, 304 is substantially planar, although the two track pad sections are at different heights relative to each other. Deviations from the planar nature of each track pad section may occur along one or more edges, as described in greater detail below.

As seen in FIG. 5, an inclined, ramped surface 305 connects the first track pad section 302 with the second track pad section 304, such that the second track pad section 304 is disposed higher than the first track pad section 302. Alternatively, the ramped surface 305 may be declined, resulting in the second track pad section 304 being disposed lower than the first track pad section 302. In one aspect, the ramped surface 305 may comprise a bezel 306 of non-tactilely responsive material. In another aspect, the ramped surface 305 may be considered an edge of either the first track pad section 302 or the second track pad section 304. For example, the first zone on a display screen 50 may include one or more buttons or a scroll bar alongside its rightmost edge 60, and the tactile ramped surface 305 may be considered a rightmost edge 318 of the first track pad section 302, whereby the tactile ramped surface 305 operates to select those buttons or to control scrolling.

Turning to FIG. 6, the leftmost edge 324 of the first track pad section 302 similarly may include or may be disposed adjacent to an inclined surface 325. As with the ramped surface 305, the inclined surface 325 either may be a non-tactilely responsive bezel or, alternatively, may be a tactile responsive portion of the first track pad section 302. Additionally or alternatively, one or more of the other edges in the first track pad section 302 and/or the second track pad section 304 may include or may be disposed adjacent to a respective ramped surface that either forms a bezel or a tactilely responsive portion of its respective section.

Figure 7:
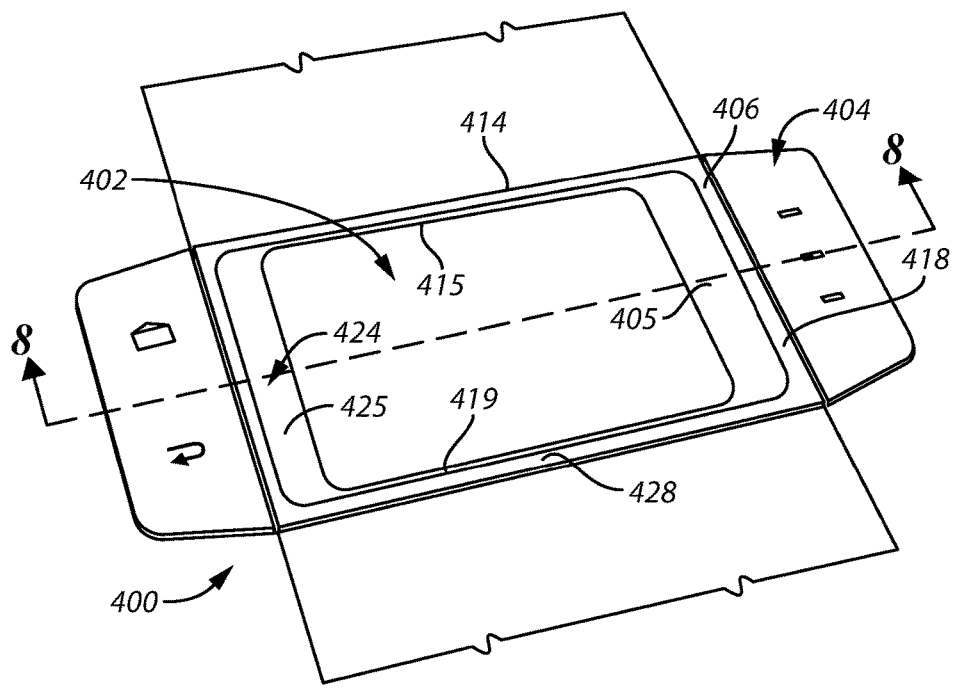
FIG. 7 is a perspective view of a fourth exemplary two-zone track pad disclosed herein.
Figure 8:
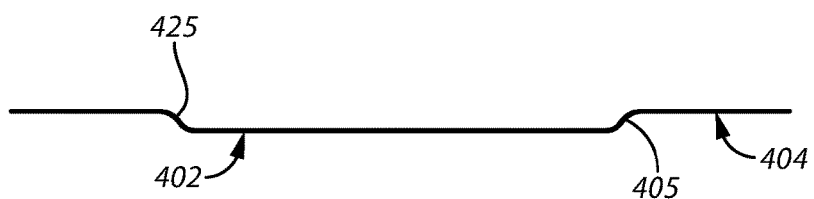
FIG. 8 is a cross-section view through the plane 8-8 in FIG. 7.

Turning now to FIGS. 7-8, a fourth track pad embodiment 400 is shown. This embodiment is a variation of the third track pad embodiment 300 in that, like the third embodiment, the first track pad section 402 is depressed at a lower level as compared to the second track pad section 404. In addition, an inclined, ramped surface 405 is disposed between the first and second track pad sections 402, 404. Unlike the third embodiment 300, in which the combination of the first and second track pad sections 302, 304 are centered on the console on which the track pad is disposed, in the fourth track pad embodiment 400, the first track pad section 302 is centered on the console, while the second track pad section 304 is offset to a side.

The first track pad section 402 is depressed on at least one, and possibly two, and still further possibly all sides. Thus, in addition to the ramped surface 405 at a rightmost edge 418 of the first track pad section 402, there also is an inclined surface 425 at a leftmost edge 424. There also may be inclined surfaces 415, 419 at the top edge 414 and a bottom edge 428, respectively, of the first track pad section 402. One or more of the inclined surfaces may be a non-tactilely responsive bezel. Additionally or alternatively, one or more of the inclined surfaces may form its respective first track pad section edge such that it is tactilely responsive to control one or more functions displayed on the display screen 50.

As shown in FIG. 7, there also is a dividing bezel 406 between the first and second track pad sections 402, 404, where the bezel 406 is depicted as a narrow, level surface separating the two track pad sections. Regardless of whether the ramped surface 405 is tactilely-responsive, the bezel 406 is not in certain embodiments. The bezel 406 additionally may continue around multiple sides of the first track pad section 402, thereby framing the first track pad section 402 and providing the user with a tactile recognition of the extent of the first track pad section 402.

In each of the embodiments disclosed above, the introduction of a bezel or tactilely-distinguishable surface between the first and second track pad sections increases the number of edges and corners that are available. For example, in a design where the first and second track pad sections are generally rectangular and form a continuous, tactilely-indistinguishable surface, there would be four corners and four sides at the boundary of the track pad. Different functionalities may be mapped to the interior "edges" or "corners" of the sections, but the user would be left to guess or estimate the locations of those "edges" or "corners," thereby resulting in the user having to spend additional time to home in on the desired position on the track pad.

In contrast, each track pad has eight tactilely-distinguishable corners and sides. These additional corners or sides can be mapped to different functionalities displayed on the display screen 50, permitting the user to quickly and easily locate and select them. Thus, in the event that the display screen shows a selectable option as being located in the top left corner of the second track pad section, for example, the user can rely on the tactile markers provided by the bezel or tactilely-distinguishable surface to quickly and easily locate that corner and select the option.

Figure 9:
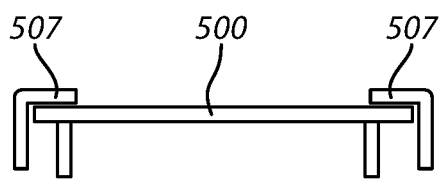
FIG. 9 is a section view depicting one example of a track pad interfacing with an adjacent bezel.

In each of the embodiments disclosed above, the bezel 507 may be fixed relative to the console surrounding the track pad 500. Thus, when the track pad 500 (as a whole or one of its sections) is depressed, the bezel 507 (i.e., the surrounding bezel and/or the interior bezel) may remain stationary while the track pad 500 moves relative to it and to the rest of the console, as depicted in FIG. 9. In this instance, a gap may be formed between the touch pad 500 and the bezel 507 each time the touch pad 507 is depressed.

Alternatively, the bezel may be a floating bezel operatively coupled to and movable with the track pad, such that when the track pad is depressed, both the track pad and the bezel move relative to the rest of the console. While this design eliminates the formation of a gap between the touch pad and the bezel, it may create a gap between the bezel and the rest of the console.

Figure 10:
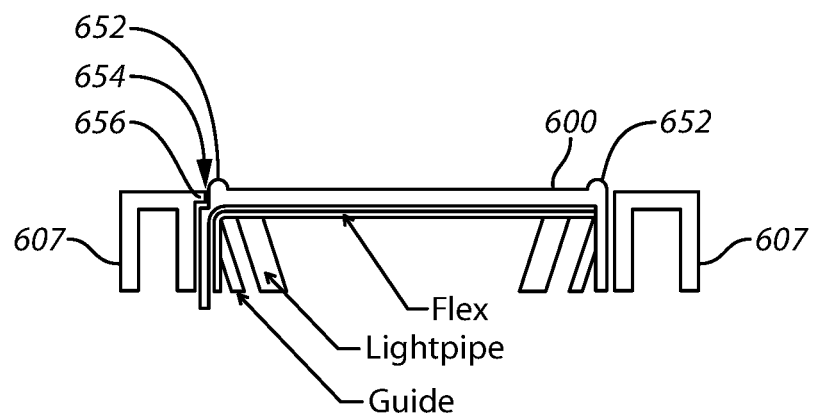
FIG. 10 is a section view depicting a second example of a track pad interfacing with an adjacent bezel.

In still another aspect, as depicted in FIG. 10, the bezel 607 may remain stationary while the track pad 600 includes a raised lip 652 along one or more of its edges. When not depressed, the lip 652 may have a height above the bezel 607 at least as large as a distance of travel for the track pad 600. Additionally, the track pad 600 may include a notch 654 spaced outward and downward from the lip 652. The notch 654 is configured to interface with a flange 656 extending laterally outward from the bezel 607. Thus, prior to depressing the track pad 600, the track pad 600 may be substantially sealed against the bezel 607 alongside and/or underneath the flange 656. Once the track pad 600 is depressed, the track pad 600 may remain sealed alongside the bezel 607, and the lip 652 may remain at or above the height of the bezel 607. Additionally, the lip 652 may serve the benefit of providing the user with a tactile indicator of the outermost limits of the track pad 600. The bezel 607 discussed with regard to this feature may be the one separating the track pad portions and/or a bezel or portion of the console surrounding the remainder of the track pad 600.

Turning now to FIG. 11, an exemplary display screen 50 is shown. As discussed above, the display screen 50 is divided into two zones 52, 54, which correspond to first and second track pad sections, such as the first and second track pad sections 102, 104 of FIG. 1. Thus, the first display screen zone 52 may be larger and to the left of the second display screen zone 54. Additionally, each display screen zone 52, 54 includes a plurality of edges and corners, including a pair of adjacent edges and two pairs of adjacent corners where the two zones meet.

One or both of the display screen zones 52, 54 include icons, indicators, and/or other specific functionality portions. For example, the first display screen zone 52 includes a plurality of icons 56 spaced along the top edge 58 and a scroll bar 59 disposed along the rightmost edge 60. Similarly, the second display screen zone 54 includes a time 62 indicator and a temperature 64 indicator along the top edge 66. Selection of these boundary-located indicators is simplified by the current dual-zone touch pad, because the user quickly is able to rely on tactile sensation to determine the boundary positions on the track pad sections that correlate to the indicator positions.

It will be appreciated that reference made herein to "left" and "right" is for illustrative purposes and reflects that the track pad is oriented so as to match the orientation of the display screen zones 52, 54 on the display screen 50. In the event that the display screen 50 is otherwise oriented, e.g., by placing the larger display screen zone to the right of the smaller display screen zone, or by placing one display screen zone vertically above the other display screen zone, the orientation of the track pad sections similarly may be modified.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Additionally, the features of various implementing embodiments may be combined to form further embodiments.

What is claimed is:

1. A two-zone track pad for controlling a two-zone display, comprising:
   a first track pad section;
   a second track pad section; and
   a bezel disposed between the first track pad section and the second track pad section,
   a two-zone display, including;
      a first display section; and
      a second display section,
   wherein the first track pad section controls operations on the first display section and the second track pad section controls operations on the second display section,
   wherein at least one of the first track pad section and the second track pad section forms part of a depression having a curved surface with a radius of curvature about a point centered over the at least one track pad section or about a line bisecting the at least one track pad section and running parallel to the bezel,
   wherein the first and second track pad sections together form part of the depression and a center of the radius of curvature is located halfway between a leftmost edge of the first track pad section and a rightmost edge of the second track pad section; and
   wherein the bezel is provided as part of the depression.

2. The two-zone track pad of claim 1, wherein at least one of an edge of the first track pad section adjacent the bezel, an edge of the second track pad section adjacent the bezel, a corner of the first track pad section adjacent the bezel, and a corner of the second track pad section adjacent the bezel corresponds to a similarly positioned function on a two-zone display.

3. The two-zone track pad of claim 1, wherein the bezel is defined by an intersection between the first track pad section and the second track pad section.

4. A two-zone track pad for controlling a two-zone display, comprising:
   a first track pad section;
   a second track pad section; and
   a bezel disposed between the first track pad section and the second track pad section,
   a two-zone display, including;
      a first display section; and
      a second display section,
   wherein the first track pad section controls operations on the first display section and the second track pad section controls operations on the second display section,
   wherein at least one of the first track pad section and the second track pad section forms part of a depression having a curved surface with a radius of curvature about a point centered over the at least one track pad section or about a line bisecting the at least one track pad section and running parallel to the bezel,
   wherein the first track pad section is disposed at a different height than the second track pad section;
   wherein the bezel forms an inclined surface between the first track pad section and the second track pad section; and
   wherein the bezel is a tactilely responsive portion of one of the first track pad and the second track pad to control one or more functions displayed on the display.

5. A system comprising: a two-zone track pad, including:
   a first track pad section;
   a second track pad section; and
   a bezel disposed between the first track pad section and the second track pad section; and
   a two-zone display, including;
      a first display section; and
      second display section,
   wherein the first track pad section controls operations on the first display section and the second track pad section controls operations on the second display section,
   wherein the first track pad section includes a raised lip along an edge adjacent the bezel, and in a non-depressed condition of the first track pad section the raised lip has a height above the bezel,
   wherein the first track pad section further includes a notch spaced outward toward the bezel and downward from the raised lip; and wherein the bezel includes an outwardly extending flange configured to interface with the notch.

6. The system of claim 5, wherein the first track pad section includes another raised lip along an edge opposite the bezel.

7. The system of claim 5, wherein at least one of an edge of the first track pad section adjacent the bezel, an edge of the second track pad section adjacent the bezel, a corner of the first track pad section adjacent the bezel, and a corner of the second track pad section adjacent the bezel corresponds to a similarly positioned function on the two-zone display.

8. A two-zone track pad for controlling a two-zone display, the two-zone track pad comprising:
   a first track pad section configured to control operations on a first display section of a two-zone display;
   a second track pad section configured to control operations on a second display section of the two-zone display, the first track pad section larger than the second track pad section; and
   a bezel disposed between the first track pad section and the second track pad section,
   wherein the first track pad section forms part of a first depression having a first curved surface with a first radius of curvature about a first point centered over the first track pad section or about a first line bisecting the first track pad section and running parallel to the bezel;
   wherein the second track pad section forms part of a second depression having a second curved surface with a second radius of curvature about a second point centered over the second track pad section or second line bisecting the second track pad section and running parallel to the bezel; and
   wherein the first point or first line is different than the second point or second line, and
   wherein the bezel forms a third curved surface that is raised in comparison to the first surface of the first display section and the second surface of the second display section, the third surface curved in an opposite direction of the first and second curved surfaces.

9. The two-zone track pad of claim 8, wherein the bezel is defined by an intersection between the first track pad section and the second track pad section.

10. A two-zone track pad for controlling a two-zone display, comprising:
    a first track pad section;
    a second track pad section; and
    a bezel disposed between the first track pad section and the second track pad section,
    a two-zone display, including;
       a first display section; and
       a second display section,
    wherein the first track pad section controls operations on the first display section and the second track pad section controls operations on the second display section,
    wherein at least one of the first track pad section and the second track pad section forms part of a depression having a curved surface with a radius of curvature about a point centered over the at least one track pad section, and
    wherein at least one of the track pad sections is bowl-shaped with a singular depression point.

11. The two-zone track pad of claim 10, wherein the first and second track pad sections together form part of the depression and with a center of the radius of curvature about a common point located halfway between a leftmost edge of the first track pad section and a rightmost edge of the second track pad section.

12. The two-zone track pad of claim 10, wherein the depression is a first depression and the first track pad section forms part of the first depression having a first curved surface with a first radius of curvature about a first point centered over the first track pad section;
    wherein the second track pad section forms part of a second depression having a second curved surface with a second radius of curvature about a second point centered over the second track pad section; and
    wherein the first point is different than the second point.

13. The two-zone track pad of claim 10, wherein the first track pad section forms part of the depression having the curved surface, the second track pad section is substantially planar.

\* \* \* \* \*